US012499170B2

(12) United States Patent
Lin et al.

(10) Patent No.: US 12,499,170 B2
(45) Date of Patent: Dec. 16, 2025

(54) METHOD FOR DISPLAYING INFORMATION, METHOD FOR SEARCHING FOR INFORMATION AND APPARATUS

(71) Applicant: Beijing Bytedance Network Technology Co., Ltd., Beijing (CN)

(72) Inventors: Yating Lin, Beijing (CN); Linjie Wang, Beijing (CN); Peipei Wu, Beijing (CN); Shengnan Hu, Beijing (CN)

( * ) Notice: Subject to any disclaimer, the term of this patent is extended or adjusted under 35 U.S.C. 154(b) by 252 days.

(21) Appl. No.: 18/006,715

(22) PCT Filed: May 13, 2021

(86) PCT No.: PCT/CN2021/093571
§ 371 (c)(1),
(2) Date: Jan. 24, 2023

(87) PCT Pub. No.: WO2022/022002
PCT Pub. Date: Feb. 3, 2022

(65) Prior Publication Data
US 2023/0252103 A1 Aug. 10, 2023

(30) Foreign Application Priority Data
Jul. 31, 2020 (CN) .......................... 202010760603.7

(51) Int. Cl.
*G06F 16/957* (2019.01)
*G06F 16/951* (2019.01)
(52) U.S. Cl.
CPC ........ *G06F 16/9577* (2019.01); *G06F 16/951* (2019.01)

(58) Field of Classification Search
CPC .......................... G06F 16/9577; G06F 16/951
See application file for complete search history.

(56) References Cited

U.S. PATENT DOCUMENTS 6,643,640 B1 * 11/2003 Getchius ............ G06F 16/2471
707/769
2008/0294621 A1 * 11/2008 Kanigsberg ......... G06F 16/9535
707/999.005
(Continued)

FOREIGN PATENT DOCUMENTS

| CN | 102955807 A | 3/2013 |
|---|---|---|
| CN | 104035957 A | 9/2014 |

(Continued)

OTHER PUBLICATIONS

ISA China National Intellectual Property Administration, International Search Report Issued in Application No. PCT/CN2021/093571, Aug. 12, 2021, WIPO, 7 pages.

*Primary Examiner* — Kannan Shanmugasundaram
(74) *Attorney, Agent, or Firm* — Alleman Hall & Tuttle LLP

(57) ABSTRACT

A method for displaying information is provided. The method includes: receiving search information inputted by a user; acquiring multiple target search results corresponding to the search information, and multiple attribute tags; determining, for each of the attribute tags, at least one target search result under the attribute tag, where each of the target search results includes structured information; and displaying, on a search result display page, the multiple attribute tags and the at least one target search result under each of the attribute tags.

19 Claims, 6 Drawing Sheets

(56) References Cited

U.S. PATENT DOCUMENTS

| | | | | |
|---|---|---|---|---|
| 2008/0294624 | A1* | 11/2008 | Kanigsberg | G06Q 30/0269 |
| | | | | 707/999.005 |
| 2014/0181089 | A1* | 6/2014 | Desmond | G06F 16/51 |
| | | | | 707/722 |
| 2015/0348160 | A1* | 12/2015 | Ravikant | G06Q 30/0627 |
| | | | | 705/26.63 |
| 2016/0063022 | A1* | 3/2016 | Voronkov | G06F 16/93 |
| | | | | 707/742 |
| 2017/0132638 | A1* | 5/2017 | Chigusa | G06F 16/35 |
| 2018/0143975 | A1* | 5/2018 | Casal | G06F 40/51 |
| 2019/0286692 | A1* | 9/2019 | Odate | G06V 10/763 |
| 2022/0012268 | A1* | 1/2022 | Ghoshal | G06F 16/906 |

FOREIGN PATENT DOCUMENTS

| | | |
|---|---|---|
| CN | 105843817 A | 8/2016 |
| CN | 105893564 A | 8/2016 |
| CN | 107656787 A | 2/2018 |
| CN | 108268582 A | 7/2018 |
| CN | 111209374 A | 5/2020 |
| CN | 111859195 A | 10/2020 |

\* cited by examiner

METHOD FOR DISPLAYING INFORMATION, METHOD FOR SEARCHING FOR INFORMATION AND APPARATUS

CROSS REFERENCE OF RELATED APPLICATION

This application is a National phase application of PCT international patent application PCT/CN2021/093571, filed on May 13, 2021, which claims priority to Chinese Patent Application No. 202010760603.7, titled "INFORMATION DISPLAY METHOD, INFORMATION SEARCH METHOD AND APPARATUS", filed on Jul. 31, 2020 with the China National Intellectual Property Administration, both of which are incorporated herein by reference in their entireties.

FIELD

The present disclosure relates to the field of computer technology, and in particular to a method for displaying information, a method for searching for information, and a device.

BACKGROUND

Generally, when a user performs a vertical search, a search request is sent to a server through a client. The server may search for search results including vertical content corresponding to the search request based on the search request, and return the search results to the client.

There may be multiple search results corresponding to the search request. Generally, the search results are sorted and displayed according to historical click times of each of the search results. In this way, search results matching a purpose that the user performs the search may be ranked lower. The user, when fails to find a desired search result on a current page, may enter another piece of search information and send a search request again, resulting in a low search efficiency.

SUMMARY

Embodiments of the present disclosure provide at least a method and an apparatus for displaying information, and a method and an apparatus for searching for information.

In a first aspect, a method for displaying information is provided in an embodiment of the present disclosure. The method includes: receiving search information inputted by a user; acquiring multiple target search results corresponding to the search information, and multiple attribute tags; determining, for each of the attribute tags, at least one target search result under the attribute tag, where each of the target search results includes structured information; and displaying, on a search result display page, the multiple attribute tags and the at least one target search result under each of the attribute tags.

In a possible embodiment, there is a mapping relationship between the attribute tags and the target search results; and the determining, for each of the attribute tags, at least one target search result under the attribute tag includes: determining the at least one target search result under the attribute tag based on the mapping relationship.

In a possible embodiment, each of the target search results carries an attribute tag; and the determining, for each of the attribute tags, at least one target search result under the attribute tag includes: performing clustering on the multiple target search results based on attribute tags carried by the target search results, to determine the at least one target search result under the attribute tag.

In a possible embodiment, each of the target search results carries one or more attribute tags and one or more quality scores of the target search result under the one or more attribute tags, respectively, where each of the quality scores indicates a degree of matching between the target search result and one of the one or more attribute tags.

In a possible embodiment, the determining, for each of the attribute tags, at least one target search result under the attribute tag includes: determining, for each of the target search results, a target attribute tag corresponding to the target search result based on the one or more quality scores of the target search result under the one or more attribute tags carried by the target search result, respectively; and performing clustering on the multiple target search results based on target attribute tags corresponding to the target search results, to determine the at least one target search result under the attribute tag.

In a possible embodiment, the displaying, on a search result display page, the multiple attribute tags and the at least one target search result under each of the attribute tags includes: displaying the multiple attribute tags on the search result display page in a horizontal direction; selecting a first attribute tag from the attribute tags; and displaying a structured information card of at least one target search result corresponding to the first attribute tag in the horizontal direction under the first attribute tag, where the structured information card of the at least one target search result supports sliding display.

In a possible embodiment, the method further includes: receiving a first trigger operation for the attribute tags, and determining the first attribute tag based on the first trigger operation.

In a possible embodiment, the displaying, on a search result display page, the multiple attribute tags and the at least one target search result under each of the attribute tags includes: displaying the multiple attribute tags on the search result display page in a horizontal direction; and displaying, for each of the attribute tags, a structured information card of at least one target search result corresponding to the attribute tag in a vertical direction under the attribute tag, where the structured information card of the at least one target search result supports sliding display.

In a possible embodiment, the search information is for a recipe, and the attribute tags indicate attributes of the recipe.

In a possible embodiment, the structured information in the target search result includes recipe multimedia information of a target recipe and recipe description information of the target recipe, the recipe description information includes ingredients and a cooking process, and the structured information is displayed in a preset form in the structured information card.

In a possible embodiment, the method further includes: jumping, in response to a second trigger operation for any of the target search results, from the search result display page to an information page of a target search result corresponding to the trigger operation, where the structured information in the target search result is extracted from the information page.

In a second aspect, a method for searching for information is provided in an embodiment of the present disclosure. The method includes: acquiring search information; determining multiple information pages matching the search information based on an index library, where the index library includes a mapping relationship among information pages, structured information, and attribute tags; generating multiple target search results corresponding to the search information and multiple attribute tags, based on structured information and attribute tags corresponding to the information pages, where each of the target search results includes structured information; and sending, to a client, the multiple target search results and the multiple attribute tags.

In a possible embodiment, the determining multiple information pages matching the search information based on an index library includes: determining a search type of the search information to obtain a determination result; determining, based on the determination result, multiple candidate information pages matching the search information from an index library corresponding to the determination result, where each of the candidate information pages corresponds to an attribute tag; and determining, from the candidate information pages, multiple information pages matching the search information based on quality scores of the candidate information pages.

In a possible embodiment, the determining a search type of the search information to obtain a determination result, and determining, based on the determination result, multiple candidate information pages matching the search information from an index library corresponding to the determination result includes: performing word segmentation on the search information to determine at least one search keyword contained in the search information; acquiring at least one synonym corresponding to the search keyword; and searching the index library corresponding to the determination result for multiple candidate information pages corresponding to the search information, based on the search keyword and the at least one synonym corresponding to the search keyword.

In a possible embodiment, for each of the candidate information pages, the attribute tag corresponding to the candidate information pages is determined by: presetting one or more tag keywords corresponding to the attribute tag; searching for the tag keywords from the candidate information pages; and determining, in response to any of the tag keywords being found, the attribute tag corresponding to the found tag keyword as the attribute tag of the candidate information page.

In a possible embodiment, the determining a search type of the search information to obtain a determination result includes: determining the determination result corresponding to the search information based on a trained decision model and the search information, where the decision model is obtained by training based on sample information and search type tags carried by the sample information.

In a possible embodiment, for each of the candidate information pages, a quality score of the candidate information page is determined by: determining a text correlation among a title, an abstract, and a body of the candidate information page; acquiring a text quality parameter of the candidate information page; and calculating a weighted sum of the text correlation and the text quality parameter, to obtain the quality score of the candidate information page.

In a possible embodiment, the determining a text correlation among a title, an abstract, and a body of the candidate information page includes: inputting word vectors corresponding to the title, the abstract, and the body, respectively, of the candidate information page into a trained language processing model, to obtain semantic vectors corresponding to the title, the abstract and the body, respectively of the candidate information page; and determining the text correlation among the title, the abstract and the body of the candidate information page, based on the semantic vectors corresponding to the title, the abstract, and the body, respectively, of the candidate information page.

In a possible embodiment, the determining the text correlation among the title, the abstract and the body of the candidate information page, based on the semantic vectors corresponding to the title, the abstract, and the body, respectively, of the candidate information page includes: calculating a weighted sum of the semantic vectors corresponding to the abstract and the body, respectively, of the candidate information page to obtain a first semantic vector; and multiplying a second semantic vector corresponding to the title of the candidate information page by the first semantic vector to obtain the text correlation.

In a possible embodiment, the text quality parameter includes one or both of a graphic quality parameter and an image definition.

In a possible embodiment, the determining, from the candidate information pages, multiple information pages matching the search information based on quality scores of the candidate information pages includes: determining one or more intermediate information pages from the candidate information pages based on the quality scores of the candidate information pages; and determining, from the intermediate information pages, the multiple information pages matching the search information, based on quality scores of the intermediate information pages and attribute tags corresponding to the intermediate information pages.

In a possible embodiment, the determining, the determining, from the candidate information pages, multiple information pages matching the search information based on quality scores of the candidate information pages includes: for each of the attribute tags, determining one or more candidate information pages corresponding to the attribute tag, and sorting the candidate information pages corresponding to the attribute tag according to a sequence of quality scores of the candidate information pages; and determining candidate information pages within top N position of a sorted result are regarded as the multiple information pages matching the search information, where N is a preset positive integer.

In a possible embodiment, each of the target search results includes a structured information card displaying the structured information; and the generating multiple target search results corresponding to the search information and multiple attribute tags, based on structured information and attribute tags corresponding to the information pages includes: for each of the information pages matching the search information, adding the structured information corresponding to the information page at a preset position on the structured information card based on the structured information, and generating a target search result corresponding to the information page, where the attribute tag of the information page is the attribute tag of the target search result corresponding to the information page.

In a third aspect, an apparatus for displaying information is provided in an embodiment of the present disclosure. the device includes: a receiving module, configured to receive search information inputted by a user; a first determination module, configured to acquire multiple target search results corresponding to the search information, and multiple attribute tags, and determine, for each of the attribute tags, at least one target search result under the attribute tag, where each of the target search results includes structured information; a display module, configured to display, on a search result display page, the multiple attribute tags and the at least one target search result under each of the attribute tags.

In a possible embodiment, there is a mapping relationship between the attribute tags and the target search results; and the first determination module, when determining, for each of the attribute tags, at least one target search result under the attribute tag, is configured to: determine the at least one target search result under the attribute tag based on the mapping relationship.

In a possible embodiment, each of the target search results carries an attribute tag; and the first determination module, when determining, for each of the attribute tags, at least one target search result under the attribute tag, is configured to: perform clustering on the multiple target search results based on attribute tags carried by the target search results, to determine the at least one target search result under the attribute tag.

In a possible embodiment, each of the target search results carries one or more attribute tags and one or more quality scores of the target search result under the one or more attribute tags, respectively, where each of the quality scores indicates a degree of matching between the target search result and one of the one or more attribute tags.

In a possible embodiment, the first determination module, when determining, for each of the attribute tags, at least one target search result under the attribute tag, is configured to: determine, for each of the target search results, a target attribute tag corresponding to the target search result based on the one or more quality scores of the target search result under the one or more attribute tags carried by the target search result, respectively; and perform clustering on the multiple target search results based on target attribute tags corresponding to the target search results, to determine the at least one target search result under the attribute tag.

In a possible embodiment, the display module, when displaying, on a search result display page, the multiple attribute tags and the at least one target search result under each of the attribute tags, is configured to: display the multiple attribute tags on the search result display page in a horizontal direction; select a first attribute tag from the attribute tags; and display a structured information card of at least one target search result corresponding to the first attribute tag in the horizontal direction under the first attribute tag, where the structured information card of the at least one target search result supports sliding display.

In a possible embodiment, the first determination is further configured to: receive a first trigger operation for the attribute tags, and determining the first attribute tag based on the first trigger operation.

In a possible embodiment, the display module, when displaying, on a search result display page, the multiple attribute tags and the at least one target search result under each of the attribute tags, is configured to: display the multiple attribute tags on the search result display page in a horizontal direction; and display, for each of the attribute tags, a structured information card of at least one target search result corresponding to the attribute tag in a vertical direction under the attribute tag, where the structured information card of the at least one target search result supports sliding display.

In a possible embodiment, the search information is for a recipe, and the attribute tags indicate attributes of the recipe.

In a possible embodiment, the structured information in the target search result includes recipe multimedia information of a target recipe and recipe description information of the target recipe, the recipe description information includes ingredients and a cooking process, and the structured information is displayed in a preset form in the structured information card.

In a possible embodiment, the display module is further configured to: jump, in response to a second trigger operation for any of the target search results, from the search result display page to an information page of a target search result corresponding to the trigger operation, where the structured information in the target search result is extracted from the information page.

In a fourth aspect, an apparatus for searching for information is provided in an embodiment of the present disclosure. The device includes: an acquisition module, configured to acquire search information; a second determination module, configured to determine multiple information pages matching the search information based on an index library, where the index library includes a mapping relationship among information pages, structured information and attribute tags; a generation module, configured to generate multiple target search results corresponding to the search information and multiple attribute tags, based on structured information and attribute tags corresponding to the information pages, where each of the target search results includes structured information; and a sending module, configured to send, to a client, the multiple target search results and the multiple attribute tags.

In a possible embodiment, the second determination module, when determining multiple information pages matching the search information based on an index library, is configured to: determine a search type of the search information to obtain a determination result; determine, based on the determination result, multiple candidate information pages matching the search information from an index library corresponding to the determination result, where each of the candidate information pages corresponds to an attribute tag; and determine, from the candidate information pages, multiple information pages matching the search information based on quality scores of the candidate information pages.

In a possible embodiment, the second determination module, when determining a search type of the search information to obtain a determination result, and determining, based on the determination result, multiple candidate information pages matching the search information from an index library corresponding to the determination result, is configured to: perform word segmentation on the search information to determine at least one search keyword contained in the search information; acquire at least one synonym corresponding to the search keyword; and search the index library corresponding to the determination result for multiple candidate information pages corresponding to the search information, based on the search keyword and the at least one synonym corresponding to the search keyword.

In a possible embodiment, the second determination module is further configured to determine, for each of the candidate information pages, the attribute tag corresponding to the candidate information pages by: presetting one or more tag keywords corresponding to the attribute tag; searching for the tag keywords from the candidate information pages; and determining, in response to any of the tag keywords being found, the attribute tag corresponding to the found tag keyword as the attribute tag of the candidate information page.

In a possible embodiment, the second determination module, when determining a search type of the search information to obtain a determination result, is configured to: determine the determination result corresponding to the search information based on a trained decision model and the search information, where the decision model is obtained by training based on sample information and search type tags carried by the sample information.

In a possible embodiment, the second determination module is configured to determine, for each of the candidate information pages, a quality score of the candidate information page by: determining a text correlation among a title, an abstract, and a body of the candidate information page; acquiring a text quality parameter of the candidate information page; and calculating a weighted sum of the text correlation and the text quality parameter, to obtain the quality score of the candidate information page.

In a possible embodiment, the second determination module, when determining a text correlation among a title, an abstract, and a body of the candidate information page, is configured to: input word vectors corresponding to the title, the abstract, and the body, respectively, of the candidate information page into a trained language processing model, to obtain semantic vectors corresponding to the title, the abstract and the body, respectively of the candidate information page; and determine the text correlation among the title, the abstract and the body of the candidate information page, based on the semantic vectors corresponding to the title, the abstract, and the body, respectively, of the candidate information page.

In a possible embodiment, the second determination module, when determining the text correlation among the title, the abstract and the body of the candidate information page, based on the semantic vectors corresponding to the title, the abstract, and the body, respectively, of the candidate information page, is configured to: calculate a weighted sum of the semantic vectors corresponding to the abstract and the body, respectively, of the candidate information page to obtain a first semantic vector; and multiply a second semantic vector corresponding to the title of the candidate information page by the first semantic vector to obtain the text correlation.

In a possible embodiment, the text quality parameter includes one or both of a graphic quality parameter and an image definition.

In a possible embodiment, the second determination module, when determining, from the candidate information pages, multiple information pages matching the search information based on quality scores of the candidate information pages, is configured to: determine one or more intermediate information pages from the candidate information pages based on the quality scores of the candidate information pages; and determine, from the intermediate information pages, the multiple information pages matching the search information, based on quality scores of the intermediate information pages and attribute tags corresponding to the intermediate information pages.

In a possible embodiment, the second determination module, when determining, the determining, from the candidate information pages, multiple information pages matching the search information based on quality scores of the candidate information pages, is configured to: for each of the attribute tags, determine one or more candidate information pages corresponding to the attribute tag, and sort the candidate information pages corresponding to the attribute tag according to a sequence of quality scores of the candidate information pages; and determine candidate information pages within top N position of a sorted result are regarded as the multiple information pages matching the search information, where N is a preset positive integer.

In a possible embodiment, each of the target search results includes a structured information card displaying the structured information; and the generation module, when generating multiple target search results corresponding to the search information and multiple attribute tags, based on structured information and attribute tags corresponding to the information pages, is configured to: for each of the information pages matching the search information, add the structured information corresponding to the information page at a preset position on the structured information card based on the structured information, and generate a target search result corresponding to the information page, where the attribute tag of the information page is the attribute tag of the target search result corresponding to the information page.

In a fifth aspect, a computer device is further provided in an embodiment of the present disclosure. The computer device includes a process, a memory, and a bus. The memory stores machine-readable instructions that are executable by a processor. The processor communicates with the memory through the bus when the computer device is running. The machine-readable instructions, when executed by the processor, implement the first aspect or any of possible embodiments in the first aspect, or the second aspect or any of possible embodiments in the second aspect.

In a sixth aspect, a computer-readable storage medium is further provided in an embodiment of the present disclosure. The computer-readable storage medium stores a computer program. The computer program, when executed by a processor, implements the first aspect or any of possible embodiments in the first aspect, or the second aspect or any of possible embodiments in the second aspect.

In the method for displaying information, the method for searching for information and the corresponding devices provided by the embodiments of the present disclosure, after multiple target search results corresponding to the search information are acquired, the target search results are displayed under a corresponding attribute tag based on the attribute tags corresponding to the target search results. Hence, a classified display of the target search results is realized. Through this method, different attribute tags can be displayed the user intuitively, and users can select an attribute tag that the user is interested in to view the target search results under this attribute tag. On the one hand, a user demand for viewing target search results under different attribute tags is satisfied; and on the other hand, it is convenient for the user to quickly locate the target search result that the user in interested in, so that a search efficiency is improved.

In order to make the above objectives, features and advantages of the present disclosure more obvious and understandable, hereinafter is a detailed description of preferred embodiments in combination with accompany drawings.

BRIEF DESCRIPTION OF THE DRAWINGS

In order to more clearly illustrate technical solutions in embodiments of the present disclosure, the drawings to be used in the description of the embodiments or are briefly described below. The drawings herein are incorporated into the specification and constitute a part of the specification. The drawings show embodiments of the present disclosure. The drawings and the specification are used to explain the technical solutions of the present disclosure. It should be understood that the following drawings show only some embodiments of the present disclosure, and thus should not be regarded as a limitation to a scope. For those skilled in the art, other relevant drawings can be obtained from these drawings without any creative effort.

DETAILED DESCRIPTION

Figure 1:
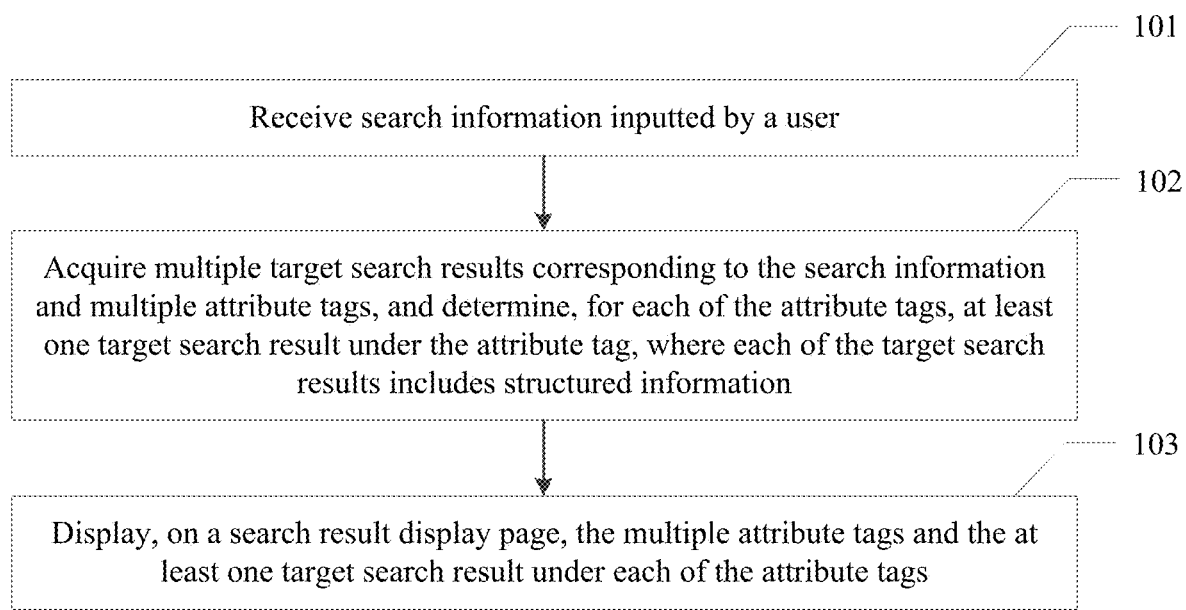
FIG. 1 shows a flowchart of a method for displaying information according to an embodiment of the present disclosure.

In order to make the object, the technical solutions, and the advantages of embodiments of the present disclosure more clear, the technical solutions in the embodiments of the present disclosure are clearly and completely described hereinafter in conjunction with the drawings in the embodiments of the present disclosure. Apparently, the described embodiments are only a few rather than all of the embodiments of the present disclosure. The components of the embodiments of the present disclosure, which are generally described and illustrated in drawings herein, may be arranged and designed in various different configurations. Therefore, the following detailed description of the embodiments of the present application provided in the accompanying drawings is not intended to limit the claimed scope of the present application, but merely represents selected embodiments of the present application. All other embodiments acquired by those skilled in the art based on the embodiments of the present disclosure without any creative effort shall fall within the protection scope of the present disclosure.

In the conventional technology, search results of a recipe are displayed sequentially. However, such display mode may not meet a user demand for a search, and the user may need to launch a search again based on another search term. For example, a user may issue a search request of "Kung Pao Chicken", but the user is actually interested in "a daily recipe of Kung Pao Chicken", and search results that the user interested in may be ranked low. Hence, the user cannot view any search result corresponding to the "daily recipe of Kung Pao Chicken" on a current page, and thus the user may request again with the "daily recipe of Kung Pao Chicken", resulting in a low search efficiency.

Based on the above, a method and an apparatus for displaying information, and a method and an apparatus for searching for information are provided in the present disclosure. After multiple target search results corresponding to the search information are acquired, the target research results may be displayed under attribute tags based on correspondence between the target research results and the attribute tags, thereby realizing a classified display of the target search results. Through this method, different attribute tags can be displayed to the user intuitively, and the user can select an attribute tag that the user is interested in to view the target search results under this attribute tag. On the one hand, a user demand for viewing target search results under different attribute tags is satisfied; and on the other hand, it is convenient for the user to quickly locate the target search result that the user is interested in, so that a search efficiency is improved.

The defects of the above solutions are all results obtained after practice and careful study by the inventor. Therefore, both the discovery process of the above problems and the solutions proposed by the present disclosure below for the above problems should be contribution from the inventor to the present disclosure.

It should be noted that: similar labels and letters indicate similar items in the following drawings. Therefore, once an item is defined in one drawing, the item does not need to be further defined and explained in subsequent drawings.

In order to facilitate understanding of the embodiments, a method for displaying information disclosed in an embodiment of the present disclosure is introduced in detail first. An execution subject of the method is generally a terminal device, which may be a smart phone, a tablet computer, a smart TV, a personal computer, and the like.

Reference is made to FIG. 1, which is a flowchart of a method for displaying information according to an embodiment of the present disclosure. The method includes steps 101 to 103.

In step 101, search information inputted by a user is received.

In step 102, multiple target search results corresponding to the search information and multiple attribute tags are acquired, and for each of the attribute tags, at least one target search result under the attribute tag is determined, where each of the target search results includes structured information.

In step 103, the multiple attribute tags and the at least one target search result under each of the attribute tags are displayed on a search result display page.

The following provides a detailed description of the above steps 101 to 103.

For step 101, after receiving the search information inputted by the user, a user terminal may generate a search request based on the search information, and send the generated search request to a corresponding server. The search request may carry the search information.

For step 102, after acquiring the multiple target search results corresponding to search information and the multiple attribute tags, the at least one target search result under each of the attribute tags is determined through any of the following methods.

Method 1

There is a mapping relationship between the multiple attribute tags and the multiple target search results. For each of the attribute tags, the at least one target search result under the attribute tag may be directly determine based on the mapping relationship between the multiple attribute tags and the multiple target search results.

Here, the mapping relationship may specifically be a mapping relationship between the attribute tags and identifications of the target search results. The mapping relationship may be generated by the server after determining the target search results.

For example, the mapping relationship may be as shown in Table 1 below.

TABLE 1

| Attribute tag | Target search result |
|---|---|
| 1 | a, b, c, d |
| 2 | e, f, g, h |

Method 2

Each of the target search results carries an attribute tag. For each of the attribute tags, the at least one target search result under the attribute tag may be determined by performing clustering on the target search results based on the attribute tags carried by the target search results.

In an implementation, during the clustering, target search results carrying a same attribute tag may be classified into a same category. After all the target search results are classified, the at least one target search result under each of the attribute tags can be determined.

Method 3

Each of the target search result carries one or more attribute tag and one or more quality scores of the target search result under the one or more attribute tags, respectively, where each of the quality scores indicates a degree of matching between the target search result and one of the one or more attribute tags. The one or more quality scores corresponding to the target search result are determined by the server.

In a process of determining, for each of the attributes tags, at least one target search result under the attribute tag: for each of the target search results, a target attribute tag corresponding to the target search result is determined based on the one or more quality scores of the target search result under the one or more attribute tags carried by the target search result, respectively; and clustering is performed on the multiple target search results based on target attribute tags corresponding to the target search results, to determine the at least one target search result under the attribute tag.

In a possible embodiment, in a process of determining, for each of the target search results, the target attribute tag corresponding to the target search result: the attribute tag with a highest quality score among the one or more attribute tags carried by the target search results may be determined as the target attribute tag corresponding to the target search result.

Implementations of step 103 are described below.

Figure 2A:
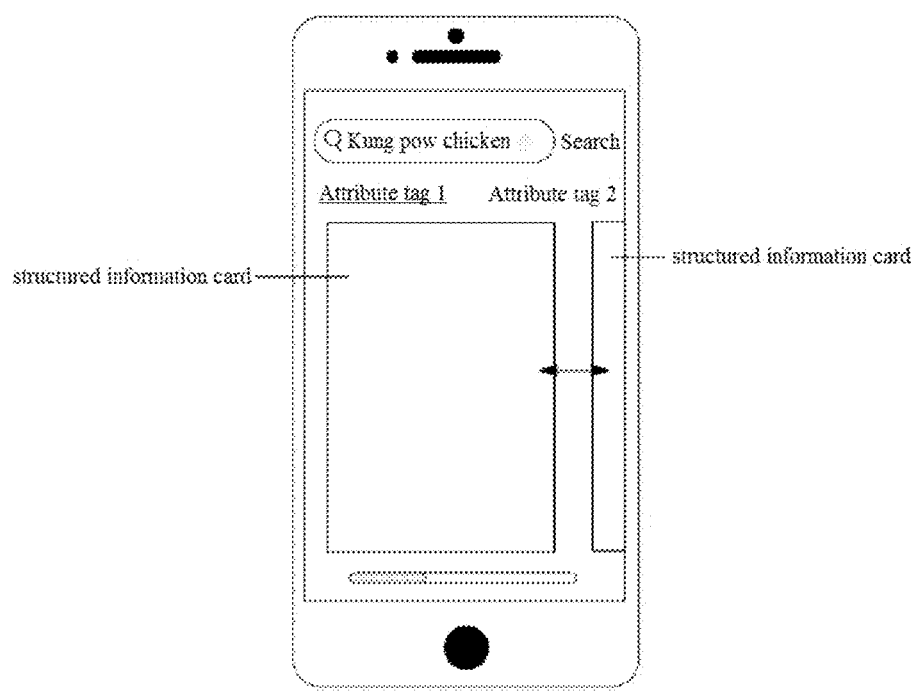
FIG. 2a shows a schematic diagram of a search result display page according to an embodiment of the present disclosure.

In a possible embodiment, in a process of displaying, on a search result display page, the multiple attribute tags and the at least one target search result under each of the attribute tags: the multiple attribute tags may be displayed on the search result display page in a horizontal direction, a first attribute tag may be selected from the attribute tags, and a structured information card of at least one target search result corresponding to the first attribute tag may be displayed in the horizontal direction under the first attribute tag. The structured information card of the at least one target search result supports sliding display. For example, the search result display page may be as shown in FIG. 2*a*.

When displaying the multiple attribute tags in the horizontal direction, the attribute tags may be displayed according to a preset display order. In a possible embodiment, the search information is for a recipe, and the attribute tags indicate attributes of the recipe. Examples of the attribute tags may include "for home cooking", "easy", "famous", and the like.

In a process of determining the first attribute tag: an attribute tag corresponding to a first trigger operation may be determined as the first attribute tag on reception of the first trigger operation for the attribute tags; or the first attribute tag may be the attribute tag displayed first.

Each attribute tag may correspond to at least one target search result. In a process of displaying, on the search result display page, the at least one target search result under the first attribute tag: quality scores corresponding to the at least one target search result may be sorted, and the at least one target search result may be displayed side by side according to the sorted quality scores.

Figure 2B:
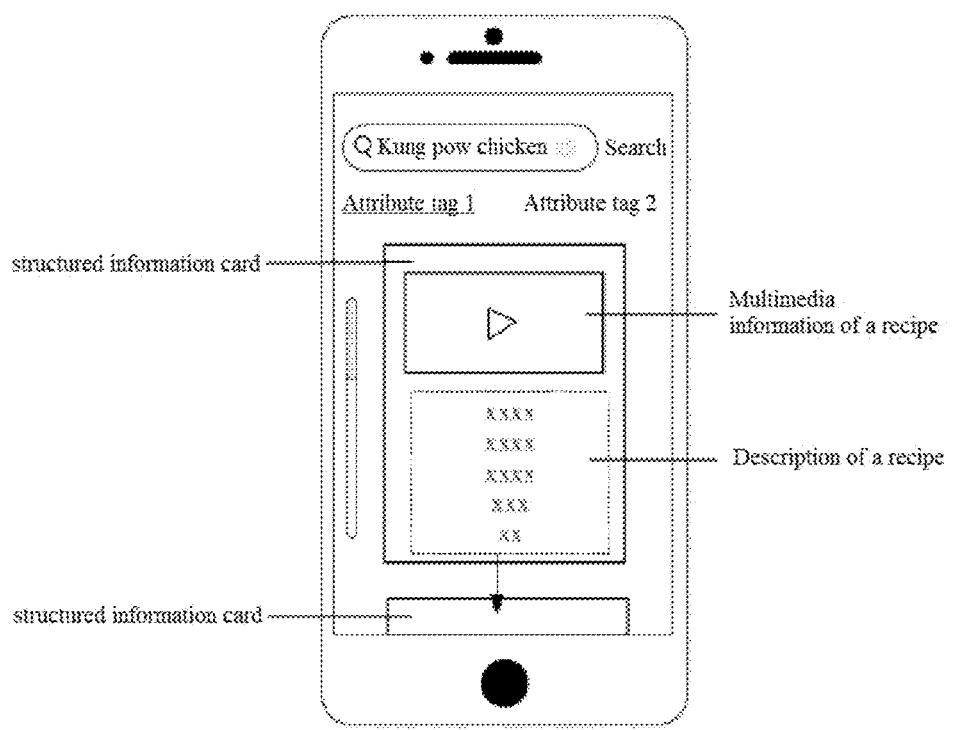
FIG. 2b shows a schematic diagram of a search result display page according to another embodiment of the present disclosure.

In another possible embodiment, in a process of displaying, on the search result display page, the multiple attribute tags and the at least one target search result under each of the attribute tags: the multiple attribute tags may be displayed on the search result display page in a horizontal direction; for each of the attribute tags, a structured information card of at least one target search result corresponding to the attribute tag is displayed under the attribute tag in a vertical direction. The structured information card of the at least one target search result supports sliding display. For example, the search result display page can be as shown in FIG. 2*b*.

It should be noted here that in addition to the target search results, other natural search results are further displayed on the search results display page. Here, the structured information card of the at least one target search result supports sliding display. By sliding up and down, multiple cards of structured information under a same attribute tag may be displayed in a switchable. In a case that a user wants to view other natural search results other than the target search results, the natural search result can be determined based on a sliding distance made by the user.

For example, in a case that the sliding distance at a client is less than a first preset distance, the structured information card displayed under the current attribute tag may be switched. In a case that the sliding distance at the client is greater than or equal to the first preset distance, the search result display page may be directly slid up to display other natural search results.

In a possible application scenario, the structured information in a target search result may include recipe multimedia information of a target recipe and recipe description information of the target recipe. The recipe description information includes ingredients and a cooking process. Recipe evaluation information may include score, popularity, number of collections, cooking time, and the like. The cooking process may include video demonstration and cooking steps. The structured information is displayed in a preset form in the structured information card.

The recipe multimedia information may be information that presents the recipe in a form of multimedia. For example, the recipe multimedia information may include an image for the recipe, and/or a video for the recipe. The video for the recipe may displays the recipe in a form of video.

For example, as shown in FIG. 2*b*, when generating the structured information card corresponding to the structured information, the recipe multimedia information may be displayed at a first preset position on the structured information card, and the recipe description may be displayed at a second preset position on the structured information card.

Figure 3:
FIG. 3 shows a schematic diagram of a search result display page according to another embodiment of the present disclosure.

As an example, the search result display page is as shown in FIG. 3, which includes: four attribute tags, i.e., "For home cooking", "Goes well with rice", "Easy", and "Famous", where the first attribute tag is the "For home cooking". Shown in FIG. 3 is a search result with the highest quality score under the first attribute tag. This search result includes cooking video, ingredients, and cooking steps (that is, "Recipe" shown FIG. 3).

On reception of target search results, the above multiple attribute tags may be displayed initially, and the target search result with the highest quality score under the first attribute tag may be displayed under the first attribute tag. In a possible embodiment, a target search result has the highest quality score under a second attribute tag other than the first attribute tag may be displayed in response to a trigger operation for the second attribute tag.

The trigger operation for the second attribute tag may include clicking, double clicking, long press, heavy press, and the like.

For example, on the display page as shown in FIG. 3, after the user clicks the attribute tag of "Goes well with rice", a target search result has the highest quality score under the attribute tag of "Goes well with rice" may be displayed.

In another possible embodiment, other target search results may be displayed in response to a sliding operation for other target search results except the target search result having the highest quality score.

For example, the sliding operation for other target search results except the target search result having the highest quality score, on the display page shown in FIG. 3, the user may slide left and right on a region where the video is displayed, so as to display other target search results under the attribute tag of "For home cooking".

In a possible embodiment, in response to a second trigger operation for any of the target search results, the search result display page may be jumped to an information page of a target search result corresponding to the trigger operation, where the structured information of the target search result is extracted from the information page.

The information page of the target search result may display a video, a picture, a text, a comment and other information corresponding to the target search result.

In addition, the method provided in the present disclosure may be applicable to other search information that can be explained by steps in detail. For example, the search information may be an origami tutorial. In such case, the attribute tags corresponding to the search results of the origami tutorial may include, "easy to learn", "exquisite", and the like. The attribute tags are preset.

In the method for displaying information provided in the embodiments of the present disclosure, after multiple target search results corresponding to the search information are acquired, the target search results are displayed under attribute tags based on the correspondence between the target search results and the attributes tags, so as to achieve a classified display of the target search results. With this method, target search content under different attribute tags can be intuitively displayed to users, and the users can view different target search results based on a selection among the displayed attribute tags. Thereby, the user demand for searching based on different attribute tags is satisfied, and the search efficiency is improved.

Figure 4:
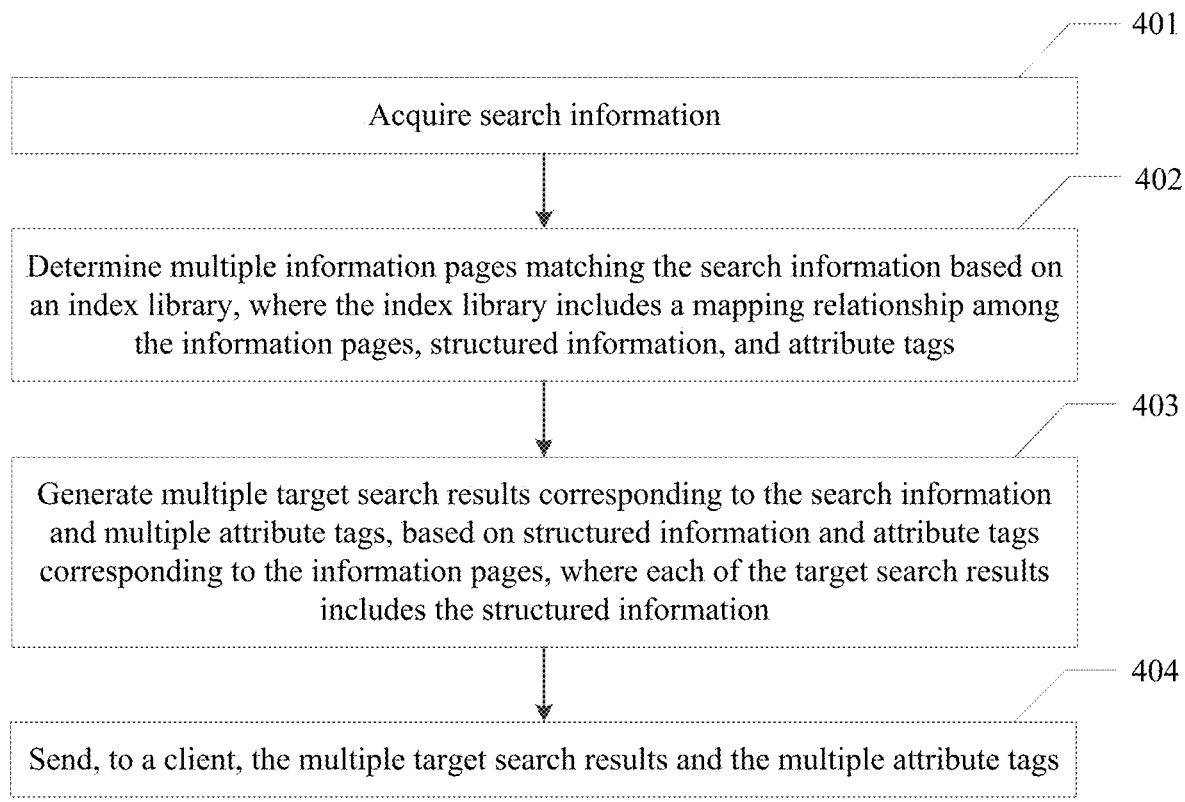
FIG. 4 shows the flow diagram of a method for searching for information according to an embodiment of the present disclosure.

Reference is made to FIG. 4, which is a flowchart of a method for searching for information according to an embodiment of the present disclosure. The method is applicable to a server. The method includes steps 401 to 404.

In step 401, search information is acquired.

In step 402, multiple information pages matching the search information are determined based on an index library, where the index library includes a mapping relationship among information pages, structured information, and attribute tags.

In step 403, multiple target search results corresponding to the search information and multiple attribute tags are determined based on structured information and attribute tags corresponding to the multiple information pages, where each of the target search results includes structured information.

In step 404, the multiple target search results and the multiple attribute tags are sent to a client.

The following provides a detailed description of the above steps 401 to 404.

For step 401, acquisition of the search information may refer to acquisition of a search request sent from the client, where the search request carries the search information inputted by the user.

For step 402, in an example, the index library stores multiple information pages, the structured information extracted from the information pages, and the attribute tags corresponding to the information pages. The mapping relationship among the information pages, the structured information, and the attribute tags may be a mapping relationship among identifications of the information pages, identifications of the structured information, and the attribute tags.

Figure 5:
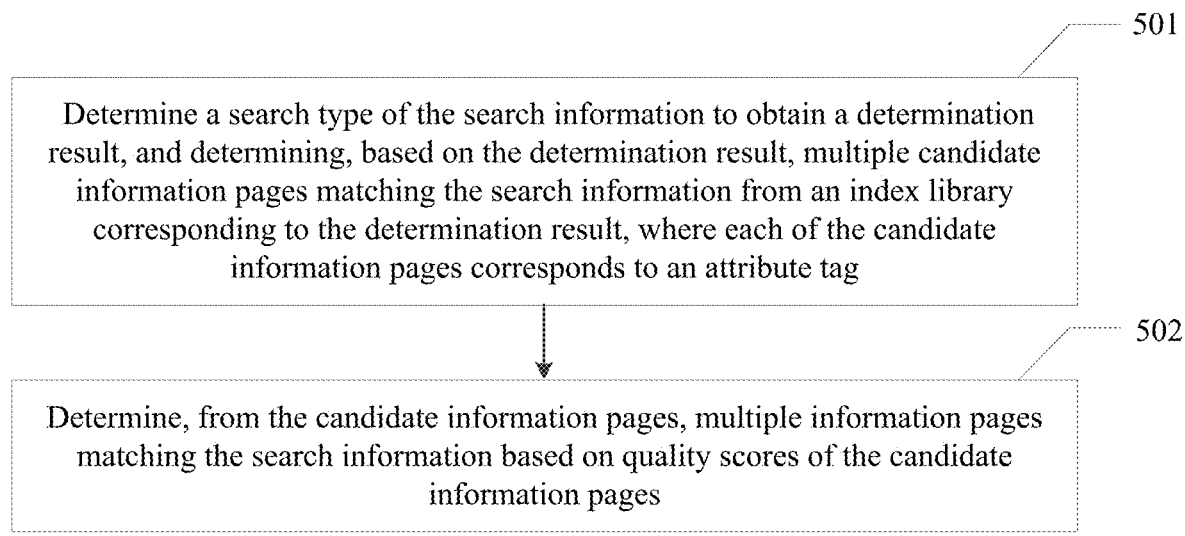
FIG. 5 shows a schematic diagram of a method for determining target search results and an attribute tag corresponding to each of the target search results according to an embodiment of the present disclosure.

In a possible embodiment, a process of determining the multiple information pages matching the search information based on the index library may be implemented through a method as shown in FIG. 5, including the following steps 501 to 502.

In step 501, a search type of the search information is determined to obtain a determination result, and multiple candidate information pages matching the search information are determined, based on the determination result, from an index library corresponding to the determination result, where each of the candidate information pages corresponds to an attribute tag.

In a process of determining the multiple candidate information pages corresponding to the search information based on the determination result: a word segmentation may be performed on the search information to determine at least one search keyword contained in the search information; at least one synonym corresponding to the search keyword is acquired; and the index library corresponding to the determination result is searched for multiple candidate information pages corresponding to the search information, based on the search keyword, the at least one synonym corresponding to the search keyword, where the index library may be an inverted index library.

The inverted index library stores multiple indexes, and different recognition results correspond to different inverted index libraries. For example, in a case that the recognition result of the search information is a recipe search, multiple candidate information pages corresponding to the search information may be found from the inverted index library of recipes. In a case that the recognition result of the search information is origami tutorial search, multiple candidate information pages corresponding to the search information may be found from the inverted index library of origami tutorials.

In a possible embodiment, each index in the inverted index library corresponds to a unique index keyword, and the index can be directly retrieved based on the index keyword. In a process of searching the inverted index library corresponding to the determination result for multiple candidate information pages corresponding to the search information based on the search keyword and the at least one synonym corresponding to the search keyword: a correlation between the search keyword or the synonyms of the search keyword and one of index keywords corresponding to the indexes may be calculated individually. In a case that the correlation corresponding to an index is greater than a preset correlation, the information page corresponding to the index information may be determined as a candidate information page matching the search information.

The indexes stored in the inverted index library may include index keywords and inverted lists indicating inclusion of the index keywords. An exemplary storage form of the inverted index library may be as shown in Table 1 below.

TABLE 1

| Index keyword | Inverted list |
|---|---|
| Kung Pao Chicken | (5, 1) |
| Yu-Shiang Shredded Pork | (2, 1), (5, 1) |
| Shredded Pork in Beijing Sauce | (1, 1), (3, 3), (4, 2) |

An inverted list (x, y) represents that the index keyword is located at a position y on an information page x. For example, 1 may represent a title part, 2 represents a summary part, and 3 represents a body part. The index keyword "Shredded Pork in Beijing Sauce" is contained in the title part on the first information page, the body part on the third information page, and the summary part on the fourth information page.

Based on the search keyword and the at least one synonym corresponding to the search keyword, one or more corresponding inverted lists may be found, and then the found inverted lists are merged. The information page in the list after merging is used as a candidate information page corresponding to the search information.

The inverted index library further stores structured information corresponding to the multiple information pages, each of the information page has a preset attribute tag, and the structured information corresponding to the information page may be extracted from the information page.

For example, for the index keyword "Kung Pao Chicken", there may be multiple information pages corresponding to the index keyword, an information page with more clicks may be selected as the information page corresponding to the key word "Kung Pao Chicken", and structured information may be extracted from the selected information page, as the structured information corresponding to the information page.

In a process of extracting structured information from information pages, extraction may be performed in terms of title, abstract, introduction, ingredients, steps, author information and other contents. For example, the extracted structured information may be as shown in Table 2 below.

TABLE 2

| Extracted content | Title | Introduction | Ingredients | Steps | Author information |
|---|---|---|---|---|---|
| Details | | | | | |

In Table 2 above, the content filled in the details may be extracted from the information page. Here, since the content to be extracted is fixed, each structured information may be displayed in a structured information card in a preset form when displaying the search results.

In a possible embodiment, when storing information pages in the index library, an attribute tag corresponding to the information page may be pre-stored in the index library. Specifically, the attribute tag corresponding to the candidate information page may be determined in advance through the following steps: presetting, for each of the attribute tags, at least one tag keyword corresponding to the attribute tag; searching for the tag keyword from the candidate information pages, and determining, in response to any of the tag keywords being found, the attribute tag corresponding to a found tag keyword as the attribute tag of the candidate information page.

For example, the tag keywords corresponding to the attribute tag "For home cooking" may be set as "family practice", "detailed family steps", and the like. The tag words corresponding to the attribute tag "Famous" may be set as names of authors.

Different attribute tags have different search locations in an index file. For example, the attribute tag "For home cooking" may be found in a title part and an introduction part of the index file, the attribute tag "Goes well with rice" may be found in a user comments part of the index file, and the attribute tag "Famous" may be found in an author name part of the index file.

In a case that no tag keyword is found in the index file, an attribute tag maybe added to the index file manually.

In another possible embodiment, in a process of determining, for each of the information pages, an attribute tag corresponding to the information page: the candidate information pages may be inputted into a pre-trained neural network, and the neural network may output the attribute tag corresponding to the candidate information page. The neural network is trained based on a sample document, and the sample document includes pre-labeled attribute tag.

It should be noted here that the index file stored in the inverted index library may have a single attribute tag or multiple attribute tags.

In an implementation, in a process of determining a search type of the search information, a determination result corresponding to the search information may be determined based on a trained decision model and the search information. The decision model is obtained by training based on sample information and search type tags carried by the sample information.

In step 502, multiple information pages matching the search information are determined from the multiple candidate information page based on the quality scores of the multiple candidate information pages.

In a possible embodiment, in a process of determining, for each of the candidate information pages, a quality score of the candidate information page: a text correlation among a title, an abstract, and a body of the candidate information pages may be determined first; a text quality parameter of the candidate information page is acquired; and then a weighted sum of the text correlation and the text quality parameter is calculated to obtain the quality score of the candidate information page. The text quality parameter may include one or both of a graphic quality parameter and an image definition.

In a process of determining the text correlation among the title, the abstract and the body of the candidate information page: word vectors corresponding to the title, the abstract and the body, respectively, of the candidate information page may be inputted into a trained language processing model to obtain semantic vectors corresponding to the title, the abstract and the body, respectively, of the candidate information page; then the text correlation among the title, the abstract and the body of the candidate information page is determined based on the semantic vectors corresponding to the title, the abstract and the body, respectively, of the candidate information page.

The language processing model may be a BERT model, and the text correlation may indicate a degree of association between the title, the abstract and the body of the candidate information page. In a possible scenario, there is a low association between the title, the abstract, and the body of the candidate information page. Hence, in a case that a tag keyword corresponding to any attribute tag is found in the title of the candidate information page, but the association between the title and the abstract and the body of the candidate information page is low, the target search results generated based on multiple such candidate information pages may result in a low precision, and therefore the candidate information pages may be filtered by using the text correlation.

In an optional embodiment, in a process of determining the text correlation among the title, the abstract and the body of the candidate information page based on the semantic vectors corresponding to the title, the abstract, and the body, respectively, of the candidate information page: a product of the semantic vectors corresponding to the title, the abstract, and the body, respectively, of the candidate information page may be calculated, and the product may be determined as the text correlation among the title, the abstract and the body of the candidate information page.

In another possible embodiment, in a process of determining the text correlation among the title, the abstract and the body of the candidate information page based on the semantic vectors corresponding to the title, the abstract, and the body, respectively, of the candidate information page: a weighted sum of the semantic vectors corresponding to the abstract, and the body, respectively, of the candidate information page may be calculated to obtain a first semantic vector, and the first semantic vector is multiplied by a second semantic vectors corresponding to the title of the candidate information page to obtain the text correlation.

In a possible embodiment, in a process of selecting the target search results from the candidate information page based on the quality scores of the candidate information pages and the attribute tags corresponding to the candidate information page: for each of the attribute tags, one or more candidate information pages corresponding to the attribute tag are determined; and the candidate information pages corresponding to the attribute tag may be sorted according to the quality scores; and the target search results are generated based on the structured information of the candidate information pages within top N positions of the sorted result, where N is a preset positive integer.

In a possible embodiment, in a process of selecting the multiple information pages matching the search information from the candidate information pages based on the quality scores of the candidate information pages and the attribute tags corresponding to the candidate information page: the one or more intermediate information pages may be selected from the candidate information pages based on the quality scores of the candidate information pages; and then the target search result are selected form intermediate search result based on quality scores of the intermediate information pages and attribute tags corresponding to the intermediate search results.

In an example, in a process of selecting the multiple information pages matching the search information from the intermediate information pages: for each of the attribute tags, one or one or more intermediate information pages corresponding to the attribute tag may be determined based on the attribute tags corresponding to the intermediate information pages; and for each of the attribute tags, the intermediate information pages under the attribute tag are sorted according to quality scores corresponding to the intermediate information pages, and intermediate information pages in top M position are determined as the information pages matching the search information, where M is a preset value.

In a possible embodiment, in a process of determining the information pages matching the search information based on a sorting result, quantities of information pages matching the search information under different attribute tags may be the same as each other, such as, three. In another possible embodiment, different attribute tags may have different importance. The quantities of information pages matching the search information under different attribute tags may be preset. For each of the attribute tags, the information pages matching the search information may be selected based on the quantity of the attribute tag.

In a possible embodiment, there may be a case that a certain candidate information page corresponds to multiple attribute tags, and all the quality scores of the candidate information page under the attribute tags are high enough to indicate that the candidate information page can be the information page that matches the search information and under each attribute tag. In such case, the attribute tag corresponding to a candidate information page having a highest quality score may be determined as a target attribute tag corresponding to the candidate information page, and the candidate information page may be determined as the information page matching the search information under the target attribute tag.

For step 403, in a possible embodiment, each of the target search results may include a structured information card which displays structured information.

In a process of generating the multiple target search results and the multiple attribute tags corresponding to the search information based on the structured information and attribute tags corresponding to the multiple information pages: for each of the information pages matching the search information, structured information corresponding to the information page may be added at a preset position on the structured information card based on the structured information, and a target search result corresponding to the information page is generated, where the attribute tag of the information page is the attribute tag of the target search result corresponding to the information page.

For step 404, after the target search results corresponding to the target search results and the attribute tags are sent to the client, the client can display the received target search results based on the method for displaying information described with reference to FIG. 1.

In addition, in a process of the server sending the target search results to the client, other natural search results may be sent to the client. The natural search results are ordinary search results found by the server based on the search information. The target search results are different from the natural search results in that: the target search results are found in an inverted index library corresponding to the target search results, while the ordinary search results are found by the server based on all databases that can obtain search results.

In the method for displaying information, the method for searching for information and the corresponding devices provided by the embodiments of the present disclosure, after multiple target search results corresponding to the search information are acquired, the target search results are displayed under a corresponding attribute tag based on the attribute tags corresponding to the target search results. Hence, a classified display of the target search results is realized. Through this method, different attribute tags can be displayed the user intuitively, and users can select an attribute tag that the user is interested in to view the target search results under this attribute tag. On the one hand, a user demand for viewing target search results under different attribute tags is satisfied; and on the other hand, it is convenient for the user to quickly locate the target search result that the user in interested in, so that a search efficiency is improved.

Those skilled in the art can understand that in the method described in the embodiments, an order of writing the step does not mean either a strict execution order or any restriction on an implementation. A specific execution order of the steps should be determined based on functions and possible internal logics among the steps.

Based on a same inventive concept, an apparatus for displaying information is further provided in an embodiment of the present disclosure, which corresponds to the method for displaying information. Since principles for the device in the embodiment of the present disclosure to solve the problems are similar to that for the method for displaying information in the above embodiments of the present disclosure, implementations of the device can be referred to the implementations of the method, and are not repeated here.

Figure 6:
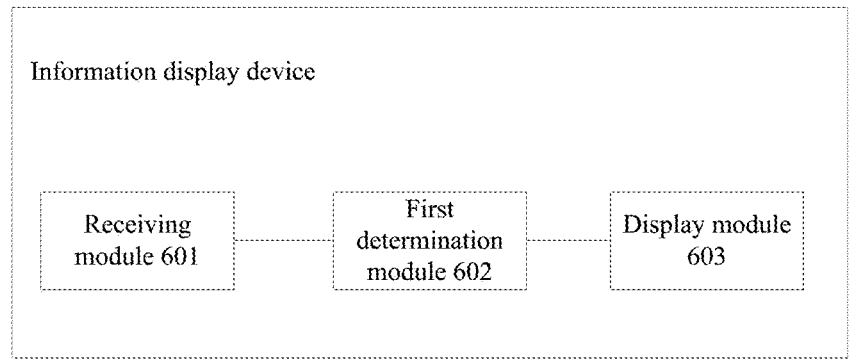
FIG. 6 shows a schematic architecture diagram of an apparatus for displaying information according to an embodiment of the present disclosure.

Reference is made to FIG. 6, which is a schematic architecture diagram of an apparatus for displaying information according to an embodiment of the present disclosure. The device includes a receiving module 601, a first determination module 602, and a display module 603.

The receiving module 601 is configured to receive search information inputted by a user.

The first determination module 602 is configured to acquire multiple target search results corresponding to the search information, and multiple attribute tags, and determine, for each of the attribute tags, at least one target search result under the attribute tag. Each of the target search results includes structured information.

The display module 603 is configured to display, on a search result display page, the multiple attribute tags and the at least one target search result under each of the attribute tag.

In a possible embodiment, there is a mapping relationship between the multiple attribute tags and the multiple target search results. The first determination module 602, when determining, for each of the attribute tags, the at least one target search result under the attribute tag, is configured to: determine the at least one target search result under the attribute tag based on the mapping relationship.

In a possible embodiment, each of the target search results carries one or more attribute tags. The first determination module 602, when determining, for each of the attribute tags, the at least one target search result under the attribute tag, is configured to: perform clustering on the multiple target search results based on attribute tags carried by the target search results, to determine the at least one target search result under the attribute tag.

In a possible embodiment, each of the target search results carries one or more attribute tags and one or more quality scores of the target search result under the one or more attribute tags, respectively, where each of the quality scores indicates a degree of matching between the target search result and one of the one or more attribute tags.

In a possible embodiment, the first determination module 602, when determining, for each of the attribute tags, the at least one target search result under the attribute tag, is configured to: determine, for each of the target search results, an target attribute tag corresponding to the target search result based on the quality scores of the target search result under the attribute tags carried by the target search result; and perform clustering on the target search results based on target attribute tags of the target search result, to determine, for each of the attribute tags, the at least one target result under the attribute tag.

In a possible embodiment, the display module 603, when displaying, on the search result display page, the multiple attribute tags and the at least one target search result under each of the target search results, is configured to: display the multiple attribute tags on the search result display page in a horizontal direction; select a first attribute tag from the attribute tags; and display a structured information card of at least one target search result corresponding to the first attribute tag in the horizontal direction under the first attribute tag, where the structured information card of the at least one target search result supports sliding display.

In a possible embodiment, the first determination module 602 is further configured to: receive a first trigger operation for the attribute tags, and determine the first attribute tag based on the first trigger operation.

In a possible embodiment, the display module 603, when displaying, on the search result display page, the multiple attribute tags and the at least one target search result under each of the target search results, is configured to: display the multiple attribute tags on the search result display page in a horizontal direction; and display, for each of the attribute tags, a structured information card of at least one target search result corresponding to the attribute tag in a vertical direction under the attribute tag, where the structured information card of the at least one target search result supports sliding display.

In a possible embodiment, the search information is for a recipe, and the attribute tags indicate attributes of the recipe.

In a possible embodiment, the structured information in each of the target search results includes recipe multimedia information of a target recipe and recipe description information of the target recipe. The recipe description information includes ingredients and a cooking process. The structured information is displayed in a preset form in the structured information card.

In a possible embodiment, the display module 603 is further configured to: jump, in response to a second trigger operation for any of the target search results, from the search result display page to an information page of a target search result corresponding to the trigger operation, where the structured information in the target search result is extracted from the information page.

Based on a same inventive concept, an apparatus for searching for information is further provided in an embodiments of the present disclosure, which corresponding to the method for searching for information. Since the principle for the device in the embodiment of the present disclosure to solve problems are similar to that for the method for searching for information in the above embodiments of the present disclosure, implementations of the device can be referred to the implementations of the method, and are not repeated here.

Figure 7:
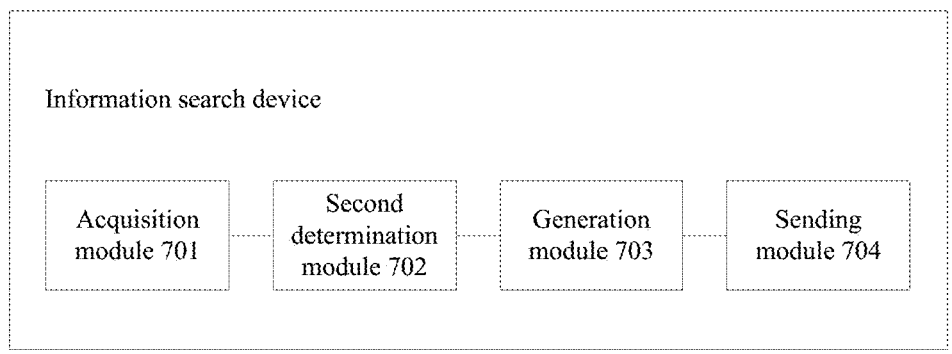
FIG. 7 shows a schematic architecture diagram of an apparatus for searching for information according to an embodiment of the present disclosure.

Reference is made to FIG. 7, which is a schematic architecture diagram of an apparatus for searching for information according to an embodiment of the present disclosure. the device includes an acquisition module 701, a second determination module 702, a generation module 703, and a sending module 704.

The acquisition module 701 is configured to acquire search information.

The second determination module 702 is configured to determine multiple information pages matching the search information based on an index library, where the index library includes a mapping relationship among information pages, structured information, and attribute tags.

The generation module 703 is configured to generate multiple target search results corresponding to the search information and multiple attribute tags, based on structured information and attribute tags corresponding to the multiple information pages, where each of the target search results includes structured information.

The sending module 704 is configured to send the multiple target search results and the multiple attribute tags to a client.

In a possible embodiment, the second determination module 702, when determining multiple information pages matching the search information based on the index library, is configured to: determine a search type of the search information to obtain a determination result, and determine, based on the determination result, multiple candidate information pages matching the search information from an index library corresponding to the determination result, where each of the candidate information page corresponds to an attribute tag; and determine, from the candidate information pages, the multiple information pages matching the search information based on quality scores of the multiple information pages.

In a possible embodiment, the second determination module 702, when determining the search type of the search information to obtain the determination result, and determining, based on the determination result, the multiple candidate information pages matching the search information from the index library corresponding to the determination result, is configured to: perform word segmentation on the search information to determine at least one search keyword contained in the search information; acquire at least one synonym corresponding to the search keyword; and search the index library corresponding to the determination result for multiple candidate information pages corresponding to the search information, based on the search keyword and the at least one synonym corresponding to the search keyword.

In a possible embodiment, the second determination module 702 is further configured to determine the attribute tag corresponding to each of the candidate information pages by: presetting, for each of the attribute tags, one or more tag keywords corresponding to the attribute tag; searching the candidate information pages for the tag keywords; determining, in response to any of the tag keywords being found, the attribute tag corresponding to the found tag keyword as the attribute tag of the candidate information page.

In a possible embodiment, the second determination module 702, when determining the search type of the search information, is configured to: determine the determination result corresponding to the search information based on a trained decision model and the search information, where the decision model is trained based on sample information and search type tags carried by the sample information.

In a possible embodiment, the second determination module 702 is configured to determine, for each of the multiple candidate information pages, a quality score of the candidate information page by: determining a text correlation among a title, an abstract, and a body of the candidate information page; and acquire a text quality parameter of the candidate information page; and calculate a weighted sum of the text correlation and the text quality parameter is calculated to obtain the quality score of the candidate information page.

In a possible embodiment, the second determination module 702, when determining the text correlation among the title, the abstract, and the body of the candidate information page, is configured to: input word vectors corresponding to the title, the abstract, and the body, respectively, of the candidate information page into a trained language processing model to obtain semantic vectors corresponding to the title, the abstract, and the body of the candidate information page; and determine the text correlation among the title, the abstract, and the body of the candidate information page based on the semantic vectors corresponding to the title, the abstract, and the body, respectively, of the candidate information page.

In a possible embodiment, the second determination module 702, when determining the text correlation among the title, the abstract, and the body of the candidate information page based on the semantic vectors corresponding to the title, the abstract, and the body, respectively, of the candidate information page, is configured to: calculated a weighted sum of the semantic vectors corresponding to the abstract and the body, respectively, of the candidate information page to obtain a first semantic vector; and multiply the first semantic vector by a second semantic vector corresponding to the title of the candidate information page to obtain the text correlation.

In a possible embodiment, the text quality parameter includes one or both of a graphic quality parameter and an image definition.

In a possible embodiment, the second determination module 702, when selecting, based on quality scores of the multiple information pages, the multiple information pages matching the search information from the candidate information pages, is configured to: determine one or more intermediate information pages from the candidate information pages based on the quality scores of the candidate information pages; and determine, from the intermediate information pages, the multiple information pages matching the search information based on quality scores of the intermediate information pages and attribute tags corresponding to the intermediate information pages.

In a possible embodiment, the second determination module 702, when selecting, based on quality scores of the multiple information pages, the multiple information pages matching the search information from the candidate information pages, is configured to: determine, for each of the attribute tags, candidate information pages corresponding to the attribute tag, and sort the candidate information pages corresponding to the attribute tag according to quality scores corresponding to the attribute tag; and determine, the candidate information pages within top N positions of a sorted result as the multiple information pages matching the search information, where N is a preset positive integer.

In a possible embodiment, the target search result includes a structured information card which displays the structured information. The generation module 703, when generating the multiple target search results corresponding to the search information and the multiple attribute tags, based on the structured information and the attribute tags corresponding to the multiple information pages, is configured to: for each of the information pages matching the search information, add structured information corresponding to the information page at a preset position on the structured information card based on the structured information, and generate a target search result corresponding to the information page, where the attribute tag of the information page is the attribute tag of the target search result corresponding to the information page.

Description of processing flows of various modules in the device and interaction flows among the various modules can refer to relevant description in the above method embodiment, and is not described in detail.

Figure 8:
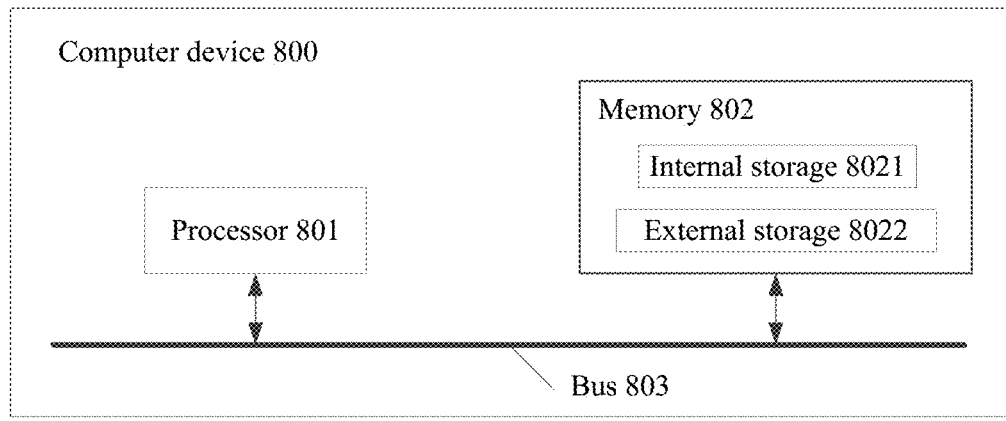
FIG. 8 shows a structural diagram of a computer device 800 according to an embodiment of the present disclosure.

Based on a same technical concept, a computer device is further provided according to an embodiment of the present disclosure. Reference is made to FIG. 8, which is a schematic structural diagram of a computer device 800 according to an embodiment of the present disclosure. The computer device 800 includes a processor 801, a memory 802, and a bus 803. The memory 802 stores execution instructions. The memory 802 includes an internal storage 8021 and an external storage 8022. The internal storage 8021 here is also referred to as an internal memory, which is configured to temporarily store operation data in the processor 801 and data exchanged with the external storage 8022, such as a hard disk. The processor 801 exchanges data with the external memory 8022 through the memory 8021. When the computer device 800 is running, the processor 801 communicates with the memory 802 through the bus 803, so that the processor 801 executes the following instructions: receiving search information inputted by a user; acquiring multiple target search results corresponding to the search information and multiple attribute tags; determining, for each of the attribute tags, at least one target search result under the attribute tag, where each of the target search results includes structured information; displaying, on a search result display page, the multiple attribute tags and the at least one target search result under each of the attribute tags.

In a possible embodiment, among the instructions executed by the processor 801, there is a mapping relationship between the multiple attribute tags and the multiple target search results. The determining, for each of the attribute tags, at least one target search result under the attribute tag includes: determining the at least one target search result under the attribute tag based on the mapping relationship.

In a possible embodiment, among the instructions executed by the processor 801, each of the target search result carries one or more attribute tags. The determining, for each of the attribute tags, at least one target search result under the attribute tag includes: performing clustering on the multiple target search results based on attribute tags carried by the target search results, to determine the at least one target search result under the attribute tag.

In a possible embodiment, among the instructions executed by the processor 801, each of the target search results carries one or more attribute tags and one or more quality scores of the target search result under the one or more attribute tags, respectively, where each of the quality scores indicates a degree of matching between the target search result and one of the one or more attribute tags.

In a possible embodiment, among the instructions executed by the processor 801, the determining, for each of the attribute tags, at least one target search result under the attribute tag includes: determining, for each of the target search results, a target attribute tag corresponding to the target search result based on the one or more quality scores of the target search result under the one or more attribute tags carried by the target search result, respectively; and performing clustering on the multiple target search results based on target attribute tags corresponding to the target search results, to determine the at least one target search result under the attribute tag.

In a possible embodiment, among the instructions executed by the processor 801, the displaying, on a search result display page, the multiple attribute tags and the at least one target search result under each of the attribute tags includes: displaying the multiple attribute tags on the search result display page in a horizontal direction; selecting a first attribute tag from the attribute tags; and displaying a structured information card of the at least one target search result corresponding to the first attribute tag under the first attribute tag, where the structured information card of the at least one target search result supports sliding display.

In a possible embodiment, among the instructions executed by the processor 801, the method further includes: receiving a first trigger operation for the attribute tags, and determining the first attribute tag based on the first trigger operation.

In a possible embodiment, among the instructions executed by the processor 801, the displaying, on a search result display page, the multiple attribute tags and the at least one target search result under each of the attribute tags includes: displaying the multiple attribute tags on the search result display page in a horizontal direction; and displaying, for each of the attribute tags, a structured information card of at least one target search result corresponding to the attribute tag in a vertical direction under the attribute tag, where the structured information card of the at least one target search result supports sliding display.

In a possible embodiment, among the instructions executed by the processor 801, the search information is for a recipe, and the attribute tags indicate attributes of the recipe.

In a possible embodiment, among the instructions executed by the processor 801, the structured information in the target search result includes recipe multimedia information of a target recipe and recipe description information of the target recipe, the recipe description information includes ingredients and a cooking process, and the structured information is displayed in a preset form in the structured information card.

In a possible embodiment, among the instructions executed by the processor 801, the method further includes: jumping, in response to a second trigger operation for any of the target search results, from the search result display page to an information page of a target search result corresponding to the trigger operation, where the structured information in the target search result is extracted from the information page.

Figure 9:
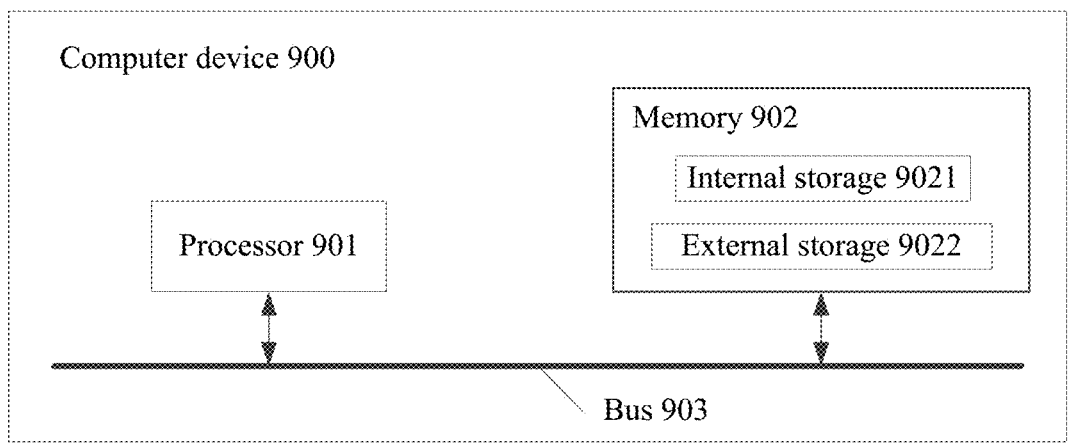
FIG. 9 shows a schematic structural diagram of a computer device 900 according to an embodiment of the present disclosure.

Based on a same technical concept, a computer device is further provided according to an embodiment of the present disclosure. Reference is made to FIG. 9, which is a schematic structural diagram of a computer device 900 according to an embodiment of the present disclosure. The computer device 900 includes a processor 901, a memory 902, and a bus 903. The memory 902 stores execution instructions. The memory 902 includes an internal storage 9021 and an external storage 9022. The internal storage 9021 here is also referred to as an internal memory, which is configured to temporarily store operation data in the processor 901 and data exchanged with the external storage 9022, such as hard disk. The processor 901 exchanges data with the external memory 9022 through the memory 9021. When the computer device 900 is running, the processor 901 communicates with the memory 902 through the bus 903, so that the processor 901 executes the following instructions: acquiring search information; determining multiple information pages matching the search information based on an index library, where the index library includes a mapping relationship among information pages, structured information, and attribute tags; generating multiple target search results corresponding to the search information and multiple attribute tags, based on structured information and attribute tags corresponding to the information pages, where each of the target search results includes structured information; and sending, to a client, the multiple target search results and the multiple attribute tags.

In a possible embodiment, among the instructions executed by the processor 901, the determining multiple information pages matching the search information based on an index library includes: determining a search type of the search information to obtain a determination result; determining, based on the determination result, multiple candidate information pages matching the search information from an index library corresponding to the determination result, where each of the candidate information pages corresponds to an attribute tag; and determining, from the candidate information pages, multiple information pages matching the search information based on quality scores of the candidate information pages.

In a possible embodiment, among the instructions executed by the processor 901, the determining a search type of the search information to obtain a determination result, and determining, based on the determination result, multiple candidate information pages matching the search information from an index library corresponding to the determination result includes: performing word segmentation on the search information to determine at least one search keyword contained in the search information; acquiring at least one synonym corresponding to the search keyword; and searching the index library corresponding to the determination result for multiple candidate information pages corresponding to the search information, based on the search keyword and the at least one synonym corresponding to the search keyword.

In a possible embodiment, among the instructions executed by the processor 901, for each of the candidate information pages, the attribute tag corresponding to the candidate information pages is determined by: presetting one or more tag keywords corresponding to the attribute tag; searching for the tag keywords from the candidate information pages; and determining, in response to any of the tag keywords being found, the attribute tag corresponding to the found tag keyword as the attribute tag of the candidate information page.

In a possible embodiment, among the instructions executed by the processor 901, the determining a search type of the search information to obtain a determination result includes: determining the determination result corresponding to the search information based on a trained decision model and the search information, where the decision model is obtained by training based on sample information and search type tags carried by the sample information.

In a possible embodiment, among the instructions executed by the processor 901, for each of the candidate information pages, a quality score of the candidate information page is determined by: determining a text correlation among a title, an abstract, and a body of the candidate information page; acquiring a text quality parameter of the candidate information page; and calculating a weighted sum of the text correlation and the text quality parameter, to obtain the quality score of the candidate information page.

In a possible embodiment, among the instructions executed by the processor 901, the determining a text correlation among a title, an abstract, and a body of the candidate information page includes: inputting word vectors corresponding to the title, the abstract, and the body, respectively, of the candidate information page into a trained language processing model, to obtain semantic vectors corresponding to the title, the abstract and the body, respectively of the candidate information page; and determining the text correlation among the title, the abstract and the body of the candidate information page, based on the semantic vectors corresponding to the title, the abstract, and the body, respectively, of the candidate information page.

In a possible embodiment, among the instructions executed by the processor 901, the determining the text correlation among the title, the abstract and the body of the candidate information page, based on the semantic vectors corresponding to the title, the abstract, and the body, respectively, of the candidate information page includes: calculating a weighted sum of the semantic vectors corresponding to the abstract and the body, respectively, of the candidate information page to obtain a first semantic vector; and multiplying a second semantic vector corresponding to the title of the candidate information page by the first semantic vector to obtain the text correlation.

In a possible embodiment, among the instructions executed by the processor 901, the text quality parameter includes one or both of a graphic quality parameter and an image definition.

In a possible embodiment, among the instructions executed by the processor 901, the determining, from the candidate information pages, multiple information pages matching the search information based on quality scores of the candidate information pages includes: determining one or more intermediate information pages from the candidate information pages based on the quality scores of the candidate information pages; and determining, from the intermediate information pages, the multiple information pages matching the search information, based on quality scores of the intermediate information pages and attribute tags corresponding to the intermediate information pages.

In a possible embodiment, among the instructions executed by the processor 901, the determining, from the candidate information pages, multiple information pages matching the search information based on quality scores of the candidate information pages includes: for each of the attribute tags, determining one or more candidate information pages corresponding to the attribute tag, and sorting the candidate information pages corresponding to the attribute tag according to a sequence of quality scores of the candidate information pages; and determining candidate information pages within top N position of a sorted result are regarded as the multiple information pages matching the search information, where N is a preset positive integer.

In a possible embodiment, among the instructions executed by the processor 901, each of the target search results includes a structured information card displaying the structured information; and the generating multiple target search results corresponding to the search information and multiple attribute tags, based on structured information and attribute tags corresponding to the information pages includes: for each of the information pages matching the search information, adding the structured information corresponding to the information page at a preset position on the structured information card based on the structured information, and generating a target search result corresponding to the information page, where the attribute tag of the information page is the attribute tag of the target search result corresponding to the information page.

A computer-readable storage medium is further provided according to an embodiment of the present disclosure. The computer-readable storage medium stores a computer program. The computer program, when executed by a processor, implements the method for displaying information or the method for searching for information described in the method embodiments. The storage medium may be a volatile or nonvolatile computer readable storage medium.

Each of the computer program product of an information display method and the computer program product of an information search method provided in the embodiments of the present disclosure includes a computer-readable storage medium that stores program code. The instructions included in the program code can be used to execute the method for displaying information and the method for searching for information described in the above method embodiments. Reference can be made to the above method embodiments for details, which are not repeated here.

A computer program is further provided in an embodiment of the present disclosure. The computer program is executed by a processor to implement any of the above embodiments. The computer program product can be realized by hardware, software or a combination thereof. In an optional embodiment, the computer program product is specifically embodied as a computer storage medium; and in another optional embodiment, the computer program product is specifically embodied as a software product, such as a software development kit (SDK).

Those skilled in the art can clearly understand that, for convenience and simplicity of description, for the working processes of the system, the apparatuses and the units described above, one may refer to corresponding processes in the above method embodiments, and the processes are not repeated herein. In the embodiments provided in this application, it is to be understood that the disclosed system, apparatus, and method may be implemented in other manners. The apparatus embodiments described above are only schematic. For example, the units are divided based on logical function, and the units may be divided in other manners in actual implementation. For example, multiple units or components can be combined or integrated into another system, or some features may be ignored or not performed. In addition, the coupling between the components, direct coupling or communication connection may be realized by some interfaces, and indirect coupling or communication connection of apparatus or units may be in an electrical, mechanical or other forms.

The above unit described as a separate component may be or may be not separated physically. The component displayed as a unit may be or may be not a physical unit, that is, may be located at one place or may be distributed on multiple network units. The objective of the solutions of the embodiments may be achieved by selecting a part or all of the units according to the practical needs.

In addition, functional units in embodiments of the present disclosure may be integrated in one processing unit, or may be physically independent. Alternatively, two or more units may be integrated in one processing unit.

If the functions are implemented in a form of a software functional unit and sold or used as an independent product, the functions may be stored in a computer-readable storage medium. Based on such understandings, the technical solutions or part of the technical solutions disclosed in the present disclosure that makes contributions to the conventional technology or part of the technical solutions may be essentially embodied in the form of a software product. The computer software product is stored in a storage medium. The computer software product includes a number of instructions that allow a computer device (which may be a personal computer, a server, or a network device) to execute all or part of the steps of the method in the embodiments of the present disclosure. The storage medium includes various medium capable of storing a program code, such as a USB flash disk, a removable hard disk, a Read-Only Memory (ROM), a Random Access Memory (RAM), a disk, and a compact disc. The computer readable storage medium according to the embodiment stores a computer program.

It should be noted that the embodiments described above are only implementation of the present disclosure, which are used for describing the technical solutions of the present disclosure rather than limiting the present disclosure. The protection scope of the present disclosure is not limited to embodiments described above. Although the present disclosure is described in detail with reference to the embodiments, those skilled in the art should understand that any technical personnel familiar with the technical field can make variations and modifications to the technical solutions disclosed in the embodiments or make equivalent substitutions to part of technical features within the technical scope disclosed in the present disclosure equivalent. The modifications, variations or substitutions do not cause the nature of the technical solutions to depart from the scope of the technical solutions according to the embodiments of the present disclosure.

What is claimed is:

1. A method for displaying information, comprising:
receiving search information inputted by a user;
acquiring a plurality of target search results corresponding to the search information, and a plurality of attribute tags;
determining, for each of the attribute tags, at least one target search result under the attribute tag, wherein the plurality of target search results comprise structured information extracted from a plurality of information pages that match the search information based on fixed content, and the attribute tags are used to classify the target search results; and
displaying, on a search result display page, the plurality of attribute tags and the at least one target search result under each of the attribute tags,
wherein the displaying, on a search result display page, the plurality of attribute tags and the at least one target search result under each of the attribute tags comprises:
displaying the plurality of attribute tags on the search result display page in a horizontal direction;
selecting a first attribute tag from the attribute tags; and
displaying a structured information card of at least one target search result corresponding to the first attribute tag in the horizontal direction under the first attribute tag, and
wherein the structured information card of the at least one target search result supports sliding display, such that multiple structured information cards associated with the first attribute tag are slidably displayed in response to a sliding operation.

2. The method according to claim 1, wherein there is a mapping relationship between the attribute tags and the target search results; and
the determining, for each of the attribute tags, at least one target search result under the attribute tag comprises:
determining the at least one target search result under the attribute tag based on the mapping relationship.

3. The method according to claim 1, wherein each of the target search results carries an attribute tag; and
the determining, for each of the attribute tags, at least one target search result under the attribute tag comprises:

performing clustering on the plurality of target search results based on attribute tags carried by the target search results, to determine the at least one target search result under the attribute tag.

4. The method according to claim 1, wherein each of the target search results carries one or more attribute tags and one or more quality scores of the target search result under the one or more attribute tags, respectively, wherein each of the quality scores indicates a degree of matching between the target search result and one of the one or more attribute tags.

5. The method according to claim 4, wherein the determining, for each of the attribute tags, at least one target search result under the attribute tag comprises:
determining, for each of the target search results, a target attribute tag corresponding to the target search result based on the one or more quality scores of the target search result under the one or more attribute tags carried by the target search result, respectively; and
performing clustering on the plurality of target search results based on target attribute tags corresponding to the target search results, to determine the at least one target search result under the attribute tag.

6. The method according to claim 1, further comprising:
receiving a first trigger operation for the attribute tags, and determining the first attribute tag based on the first trigger operation.

7. The method according to claim 1, wherein the displaying, on a search result display page, the plurality of attribute tags and the at least one target search result under each of the attribute tags comprises:
displaying the plurality of attribute tags on the search result display page in a horizontal direction; and
displaying, for each of the attribute tags, a structured information card of at least one target search result corresponding to the attribute tag in a vertical direction under the attribute tag, wherein
the structured information card of the at least one target search result supports sliding display.

8. The method according to claim 1, wherein the search information is for a recipe, and the attribute tags indicate attributes of the recipe.

9. The method according to claim 8, wherein
the structured information in the target search result comprises recipe multimedia information of a target recipe and recipe description information of the target recipe,
the recipe description information comprises ingredients and a cooking process, and
the structured information is displayed in a preset form in the structured information card.

10. The method according to claim 1, further comprising:
jumping, in response to a second trigger operation for any of the target search results, from the search result display page to an information page of a target search result corresponding to the trigger operation, wherein
the structured information in the target search result is extracted from the information page.

11. An apparatus for displaying information, comprising:
at least one processor; and
at least one memory communicatively coupled to the at least one processor and storing instructions that upon execution by the at least one processor cause the apparatus to: perform the method according to claim 1.

12. A computer-readable non-transitory storage medium storing a computer program, wherein the computer program, when executed by a processor, implements the method according to claim 1.

13. A method for searching for information, comprising:
acquiring search information;
determining a plurality of information pages matching the search information based on an index library, wherein the index library comprises a mapping relationship among information pages, structured information, and attribute tags;
generating a plurality of target search results corresponding to the search information and a plurality of attribute tags, based on structured information and attribute tags corresponding to the information pages, wherein the plurality of target search results comprise structured information extracted from the plurality of information pages that match the search information based on fixed content, and the attribute tags are used to classify the target search results; and
sending, to a client, the plurality of target search results and the plurality of attribute tags,
wherein the client displays the plurality of attribute tags on the search result display page in a horizontal direction, selects a first attribute tag from the attribute tags, and displays a structured information card of at least one target search result corresponding to the first attribute tag in the horizontal direction under the first attribute tag, and
wherein the structured information card of the at least one target search result supports sliding display, such that multiple structured information cards associated with the first attribute tag are slidably displayed in response to a sliding operation.

14. The method according to claim 13, wherein the determining a plurality of information pages matching the search information based on an index library comprises:
determining a search type of the search information to obtain a determination result;
determining, based on the determination result, a plurality of candidate information pages matching the search information from an index library corresponding to the determination result, wherein each of the candidate information pages corresponds to an attribute tag; and
determining, from the candidate information pages, the plurality of information pages matching the search information based on quality scores of the candidate information pages.

15. The method according to claim 14, wherein the determining a search type of the search information to obtain a determination result, and determining, based on the determination result, a plurality of candidate information pages matching the search information from an index library corresponding to the determination result comprises:
performing word segmentation on the search information to determine at least one search keyword contained in the search information;
acquiring at least one synonym corresponding to the search keyword; and
searching the index library corresponding to the determination result for a plurality of candidate information pages corresponding to the search information, based on the search keyword and the at least one synonym corresponding to the search keyword; or
wherein for each of the candidate information pages, the attribute tag corresponding to the candidate information pages is determined by: presetting one or more tag keywords corresponding to the attribute tag; searching for the tag keywords from the candidate information pages; and determining, in response to any of the tag keywords being found, the attribute tag corresponding to the found tag keyword as the attribute tag of the candidate information page; or wherein the determining a search type of the search information to obtain a determination result comprises: determining the determination result corresponding to the search information based on a trained decision model and the search information, wherein the decision model is obtained by training based on sample information and search type tags carried by the sample information; or wherein for each of the candidate information pages, a quality score of the candidate information page is determined by: determining a text correlation among a title, an abstract, and a body of the candidate information page; acquiring a text quality parameter of the candidate information page; and calculating a weighted sum of the text correlation and the text quality parameter, to obtain the quality score of the candidate information page.

16. The method according to claim 14, wherein the determining, from the candidate information pages, the plurality of information pages matching the search information based on quality scores of the candidate information pages comprises:

determining one or more intermediate information pages from the candidate information pages based on the quality scores of the candidate information pages; and determining, from the intermediate information pages, the plurality of information pages matching the search information, based on quality scores of the intermediate information pages and attribute tags corresponding to the intermediate information pages; or wherein the determining, from the candidate information pages, the plurality of information pages matching the search information based on quality scores of the candidate information pages comprises: for each of the attribute tags, determining one or more candidate information pages corresponding to the attribute tag, and sorting the candidate information pages corresponding to the attribute tag according to a sequence of quality scores of the candidate information pages; and determining candidate information pages within top N position of a sorted result are regarded as the plurality of information pages matching the search information, where N is a preset positive integer.

17. The method according to claim 13, wherein each of the target search results includes a structured information card displaying the structured information; and the generating a plurality of target search results corresponding to the search information and a plurality of attribute tags, based on structured information and attribute tags corresponding to the information pages comprises:

for each of the information pages matching the search information, adding the structured information corresponding to the information page at a preset position on the structured information card based on the structured information, and generating a target search result corresponding to the information page, wherein the attribute tag of the information page is the attribute tag of the target search result corresponding to the information page.

18. An apparatus for searching for information, comprising:

at least one processor; and at least one memory communicatively coupled to the at least one processor and storing instructions that upon execution by the at least one processor cause the apparatus to: perform the method according to claim 13.

19. A computer-readable non-transitory storage medium storing a computer program, wherein the computer program, when executed by a processor, implements the method according to claim 13.

* * * * *